United States Patent
Gigas et al.

(10) Patent No.: US 7,481,573 B2
(45) Date of Patent: Jan. 27, 2009

(54) MIXING IMPELLER WITH PRE-SHAPED TIP ELEMENTS

(75) Inventors: Bernd Gigas, Rochester, NY (US); Frederick W. Kehr, III, Webster, NY (US); Thomas A. Taylor, Caledonia, NY (US)

(73) Assignee: SPX Corporation, Charlotte, NC (US)

( * ) Notice: Subject to any disclaimer, the term of this patent is extended or adjusted under 35 U.S.C. 154(b) by 604 days.

(21) Appl. No.: 11/169,882

(22) Filed: Jun. 30, 2005

(65) Prior Publication Data

US 2007/0002687 A1 Jan. 4, 2007

(51) Int. Cl.
 *B01F 7/22* (2006.01)
(52) U.S. Cl. .................... 366/330.1; 416/232
(58) Field of Classification Search ........... 366/270, 366/330.1–330.7; 416/232–233
 See application file for complete search history.

(56) References Cited

U.S. PATENT DOCUMENTS

| 1,998,393 | A | * | 4/1935 | Junggren | 416/232 |
|---|---|---|---|---|---|
| 2,493,139 | A | * | 1/1950 | Heath | 416/233 |
| 2,535,917 | A | * | 12/1950 | Gruetjen | 416/233 |
| 2,544,450 | A | * | 3/1951 | Enos | 416/232 |
| 2,643,725 | A | * | 6/1953 | Heath | 416/232 |
| 2,647,586 | A | * | 8/1953 | Gruetjen | 416/233 |
| 3,389,889 | A | * | 6/1968 | Penny | 416/92 |
| 4,214,355 | A | * | 7/1980 | Zelahy | 29/889.1 |
| 4,411,597 | A | * | 10/1983 | Koffel et al. | 416/92 |
| 4,589,823 | A | * | 5/1986 | Koffel | 416/92 |
| 4,589,824 | A | * | 5/1986 | Kozlin | 416/97 R |
| 4,594,761 | A | * | 6/1986 | Murphy et al. | 29/889.71 |
| 4,802,771 | A |  | 2/1989 | Weetman |  |
| 5,344,235 | A | * | 9/1994 | Weetman et al. | 366/270 |
| 5,873,699 | A | * | 2/1999 | Watson et al. | 415/200 |
| 2005/0091848 | A1 |  | 5/2005 | Nenov et al. |  |
| 2007/0002686 | A1 | * | 1/2007 | Gigas et al. | 366/330.1 |
| 2007/0002687 | A1 | * | 1/2007 | Gigas et al. | 366/330.1 |
| 2007/0003415 | A1 | * | 1/2007 | Gigas et al. | 416/232 |

FOREIGN PATENT DOCUMENTS

| EP | 0 158 048 | A2 |  | 10/1985 |
|---|---|---|---|---|
| GB | 541759 |  |  | 12/1941 |
| GB | 980570 |  |  | 1/1965 |
| GB | 2077363 | A | * | 12/1981 |
| GB | 2154286 | A | * | 9/1985 |
| WO | WO 94/16804 |  |  | 8/1994 |

* cited by examiner

*Primary Examiner*—Charles E Cooley
(74) *Attorney, Agent, or Firm*—Baker & Hostetler LLP

(57) ABSTRACT

A blade is disclosed for use in a mixing impeller assembly. The blade includes a top skin element and a bottom skin element without an internal framework in between the elements. A unitary pre-shaped tip element is attached at an end of the blade to the top and bottom skin elements. The tip is welded to the top skin and the bottom skin, and has a bevel at the weld location. The top skin has an edge that abuts the tip and the lower skin has an edge that abuts the tip, and respective bevels are provided on these edges.

11 Claims, 5 Drawing Sheets

MIXING IMPELLER WITH PRE-SHAPED TIP ELEMENTS

FIELD OF THE INVENTION

The invention pertains generally to mixing devices, mixing assemblies and mixing methods, and more particularly pertains to radially extending impellers used in such devices and methods.

BACKGROUND OF THE INVENTION

Mixing and agitating devices are in wide use in industry. For example, mixing devices are well known in the industrial, pharmaceutical, biotechnology, and other materials processing industries. In one common type of mixer, a vessel contains the material to be mixed along with a rotating shaft that has one or more sets of radially extending impellers that extend radially from the shaft. Typically, a number of impellers are evenly circumferentially spaced around a central hub. The impellers may have for example a substantially flat blade profile shape, a curved blade profile shape, or an air foil type of blade profile shape, depending on the mixing application and the design considerations of the mixing device.

In the case of flat blades or simple curved or bent blades, it has been relatively convenient to manufacture these blades by taking metal sheet stock and bending it if necessary and welding the flat, bent or curved piece, made from a single sheet, to the hub.

In the case of blades having more complex or compound curved shapes, particularly in three dimensions, such as is needed for air foil (or wing) shaped blades, however, the construction process is more complex. In one type of prior art air foil shaped impeller blade, the blade has been constructed as follows. First, an internal skeleton has been constructed having a generally lattice type framework which has as a part of the framework a first piece of elongated bar stock that will become the leading edge of the blade and a second piece of elongated shaped stock that will become the trailing edge of the blade. The first bar stock has typically been circular in cross section. The second bar stock typically has a custom tapered shape in cross section.

A top skin and a bottom skin are then mounted over the lattice, with the front edge of the top skin being welded to an upper surface of the front bar stock, and the front edge of the bottom skin being welded to a lower edge of the front bar stock. Thus a leading edge of the blade is provided. In order provide smoother flow at the leading edge region, after the welds are made they are ground down smooth to form a smooth connection between the bar stock and the top and bottom plates respectively.

At the rear, or trailing, edge of the above described design, the top plate has also been welded to an upper surface of the trailing edge and the bottom plate has been welded to a lower surface of the trailing edge. Since it is desired for the trailing edge to have a relatively pointy taper, the trailing edge has been a relatively difficult piece to shape, and has generally been a custom machined part. The welds where the top skin meet the trailing edge piece and where the bottom skin meets the trailing edge piece have been generally ground down smooth to form a smooth contour between the top and bottom skins respectively and their connection at upper and lower portions of the machined trailing edge piece.

Further in the above described design, a tip piece has been mounted at the radial outside edge of the wing shaped impeller. This tip is required to have a relatively complex compound shape, since it needs to follow the air foil side profile when view from the end, and also generally has a rounded outer surface when seen in plan view. In the prior art, the tip was generally made of an oversized and somewhat blocked shaped piece that was then contoured in all three axes by labor intensive hand grinding to fit the desired 3-D profile.

The above described construction method, while providing satisfactory impellers, does suffer from some disadvantages. First, a total of four welds are required at the leading and trailing edges (that is, two welds at the leading edge and two welds at the trailing edge). Also, a piece of front bar stock and a piece of the rear bar stock are required. In addition, an interior skeleton is required for sparring between the front and rear bar stocks and locating them relative to each other during the assembly process. Due to the weight added by the skeleton, the overall weight of the finished impeller is thus increased for a given skin thickness. Impeller blades moving through material are subject erosion over time. The effective of erosion can be particularly pronounced with mixing abrasive material such as for example materials containing aluminum. Erosion is particularly undesirable at the welded area, because where the bar stock meets the weld, which in turn meets the top or bottom skin, the materials may wear at different rates causing roughness or discontinuity in the flow at that location, which further exacerbates the erosion problem at that location, leading to greater discontinuity and more erosion and so on.

In addition, high wear areas typically occur on the top surface of the air foil, and as a result the welds that are attaching the top skin tend to be the first to wear out since they are exposed to the top fluid path surface. Furthermore, the process of shaping the end tip after it has been welded onto the blade is somewhat labor intensive and is complicated by the fact that the shaping is not performed until the tip has been welded onto the end of the blade, instead of at a possibly more convenient time and location in the overall blade manufacturing process.

In view of the foregoing, it would be desirable to have an improved impeller blade structure and method that can alleviate the above described difficulties at least to some extent.

SUMMARY OF THE INVENTION

Some embodiments of the present invention provide an improved blade assembly and method that can alleviate the above mentioned problems at least to some extent.

In accordance with one embodiment of the present invention, a blade for use in an impeller assembly, comprises a top skin element; a bottom skin element; and a unitary pre-shaped tip element attached to the top and bottom skin elements without an internal framework and disposed at the radial outside end of the blade.

In accordance with another embodiment of the present invention, a blade for use in an impeller assembly, comprises a top skin element; a bottom skin element; and a unitary pre-shaped tip element; and means for joining the tip to the top and bottom skin without an internal framework to form the radial outside end of the blade.

In accordance with another embodiment of the present invention, a method of manufacturing a blade for one in an impeller assembly, comprises providing a top skin element; providing a bottom skin element; and attaching a pre-shaped tip to the top and bottom skin elements without an internal framework to form the radial outside end of the blade.

In accordance with another embodiment of the present invention, an impeller assembly, comprises a hub; and a plurality of blades attached to the hub, each blade comprises a top skin element; a bottom skin element; and a unitary pre-shaped tip element attached to the top and bottom skin elements without an internal framework and disposed at the radial outside end of the blade.

In accordance with yet another embodiment of the present invention, an impeller assembly, comprises a hub; and a plurality of blades attached to the hub, each blade comprises a top skin element; a bottom skin element; a unitary pre-shaped tip element; and means for joining the tip to the top and bottom skin without an internal framework to form the radial outside end of the blade.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
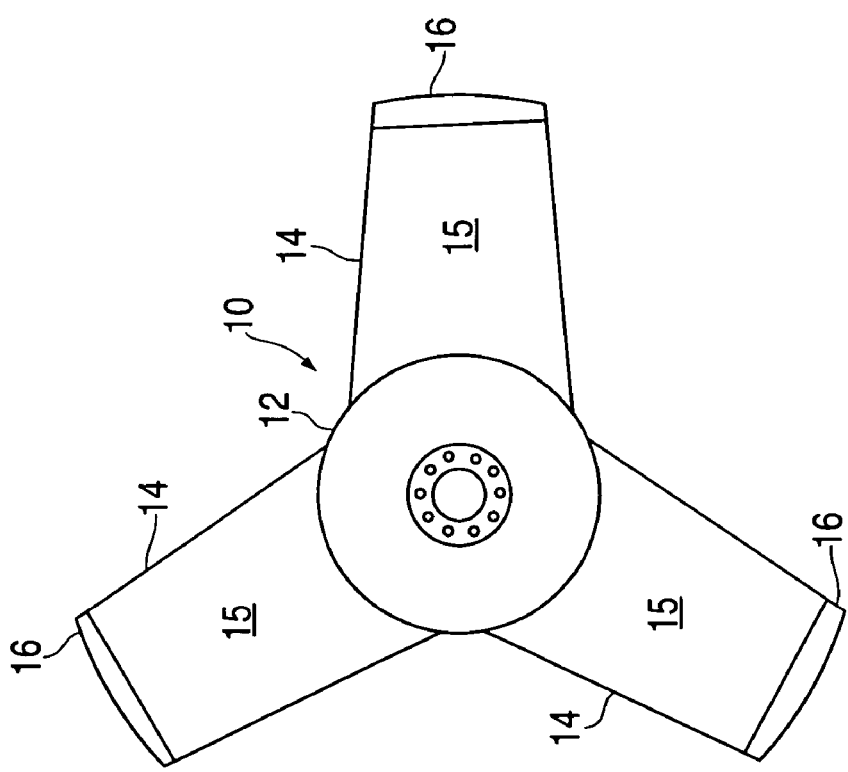
FIG. 1 is a plan view of an impeller assembly including a hub and three radially extending blades according to preferred embodiment of the present invention.

The present invention provides an improved impeller and impeller assembly and method for use in a wide range of mixing devices. The impeller assembly may in some embodiments include a central hub having a plurality of radially extending air foil shaped impeller blades. Turning to FIG. 1, for example, an impeller assembly 10 is shown having a central hub 12 with a plurality of similar air foil shaped impeller blade 14 radially extending therefrom.

Figure 2:
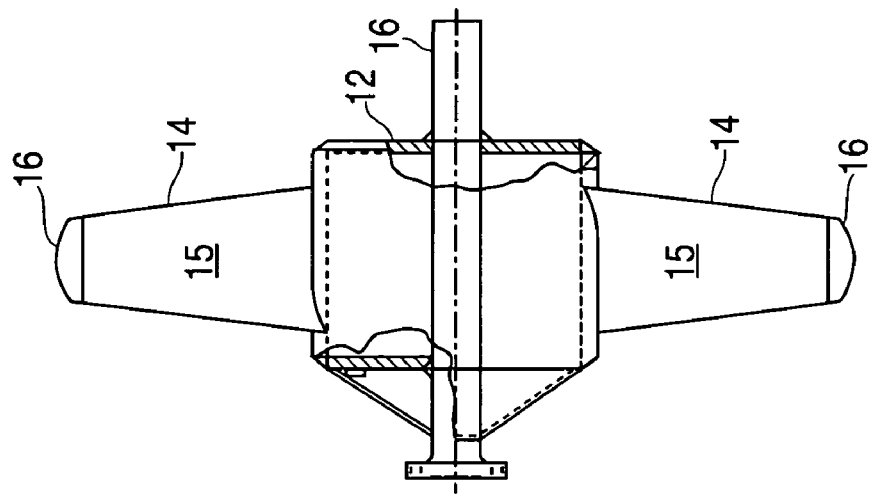
FIG. 2 is a side partially cutaway view of the impeller assembly of FIG. 1.

As seen in FIG. 2, in this example, the impeller hub 12 is welded directly onto shaft 16 for connection with other shaft pieces as appropriate in order to be mounted in the vessel and rotated. Each impeller blade 14 is generally air foil shaped and is welded onto the hub 12. Each blade 14 also features a main body 15 and a cast end tip 16 which will be discussed in more detail below.

Figure 3:
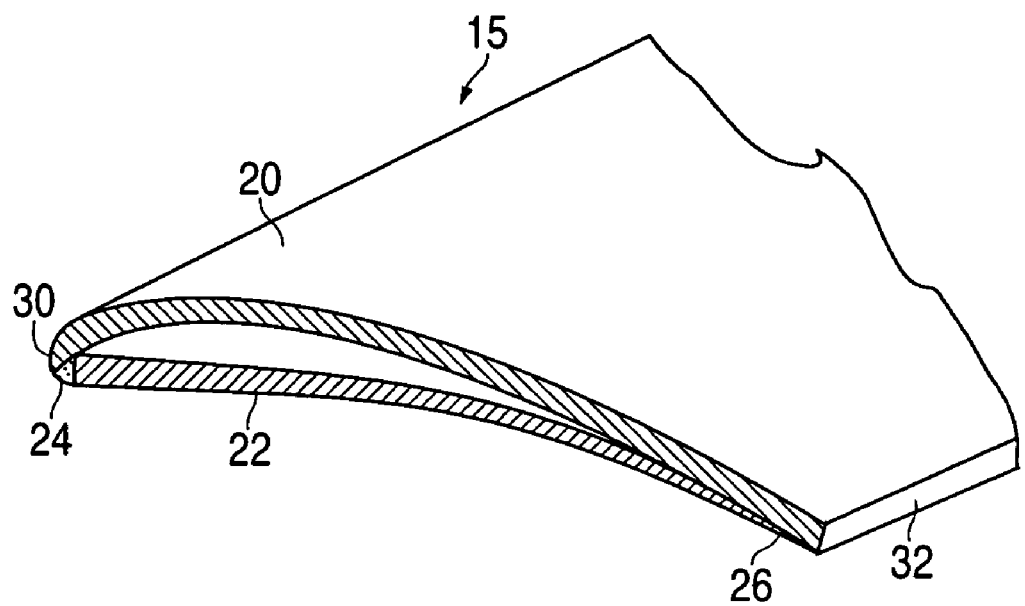
FIG. 3 is a perspective cross-sectional view of one impeller according to a preferred embodiment of the present invention.

Turning to FIG. 3 the internal construction and front (or leading) and rear (or training) end tips of the air foil shaped main body 15 can be understood. The main body 15 is formed from a top skin 20 and a lower skin 22. These pieces can be pre-shaped on a jig to have the appropriate curvature.

The top skin 20 and bottom skin 22 are joined by being welded to each other at a leading edge weld 24 and a trailing edge weld 26 respectively. It will be appreciated that by virtue of this design, the separate front and rear bar stock elements of the prior art are not necessary. Further, the internal lattice framework structure is also not necessary.

Another benefit of the configuration shown in FIG. 3 according to a preferred embodiment of the invention, is that the leading edge welded area 24 is to some extend tucked under the forward vertex 30 of the blade. That is, the vertex 30 is formed by a portion of the top skin 20. In this way, the weld area 24 has been located below the high erosion path which tends to occur near the vertex 30 and above the vertex 30. This reduces erosion failure of the weld 24 as compared to having a weld above the vertex 30.

Similarly, the weld area 26 is located underneath the top skin 20 and below the trailing edge 32 of the blade. This also reduces the susceptibility to erosion of the blade in the trailing edge area.

It can be appreciated that the design shown in FIG. 3 provides a smooth top surface that need not be subject to uneven erosion at any top surface weld locations, because weld locations need not be present along the top surface, either at the top leading edge or the top trailing edge.

Figure 4:
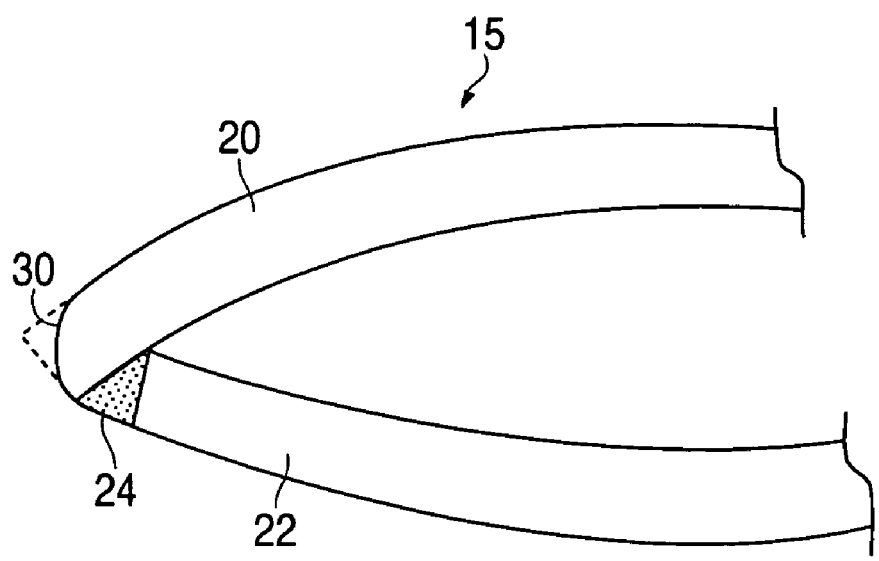
FIG. 4 is a side cross-sectional cutaway view of a leading edge of an impeller according to a preferred embodiment of the present invention.

FIG. 4 illustrates a detail of manufacture of a preferred embodiment of the leading edge 30 of the blade 14. In particular, the dotted lines illustrate the squared off edge of the top skin 20 if it is originally provided as a sheet piece at the time of welding the top skin 20 to the lower skin 22. At any time, but preferably after the weld 24 is performed, a grinding process can be carried out to remove the dotted line portion and result in the contour 30 as illustrated. At the same time, grinding can be carried out on the weld area 24 to smooth it to provide a smooth contour with the leading edge 30 and the outer surface of the bottom skin 22.

Figure 5:
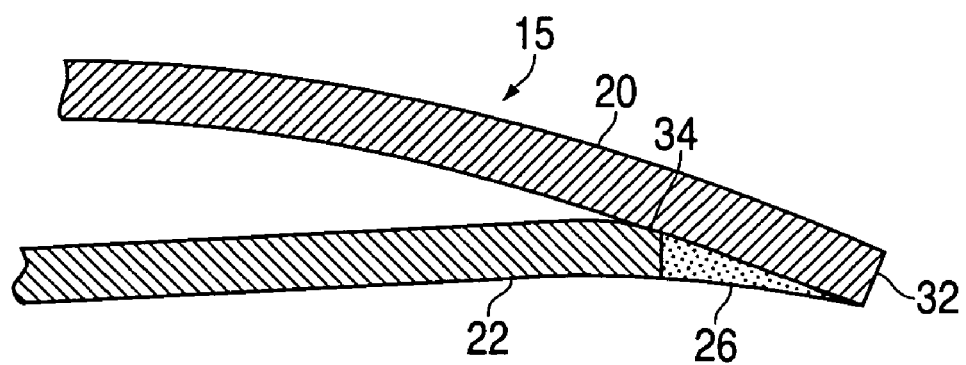
FIG. 5 is a side cross-sectional partially cutaway view of a trailing edge of a blade according to a preferred embodiment of the present invention.

FIG. 5 shows a detail of construction of the rear or trailing edge of the blade 14. The top skin 20 is attached to the lower skin 22 as shown. The lower skin 22 may have a beveled portion 34 to facilitate joining of the upper skin 20 to the lower skin 22. The weld area 26 is generally pie shaped as shown. Here it will be understood that the top skin 20 provides not only the top surface of the blade 14 but also in a unitary structure provides the trailing edge 32. Thus, discontinuities at weld areas that may lead to further erosions are avoided on the top edge.

Figure 6:
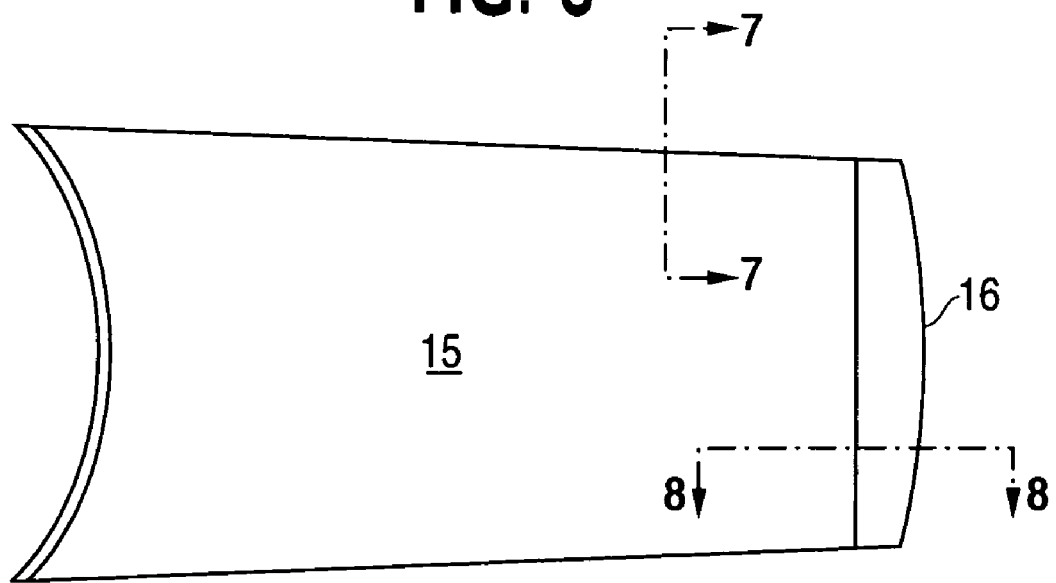
FIG. 6 is a plan view of a blade.
Figure 7:
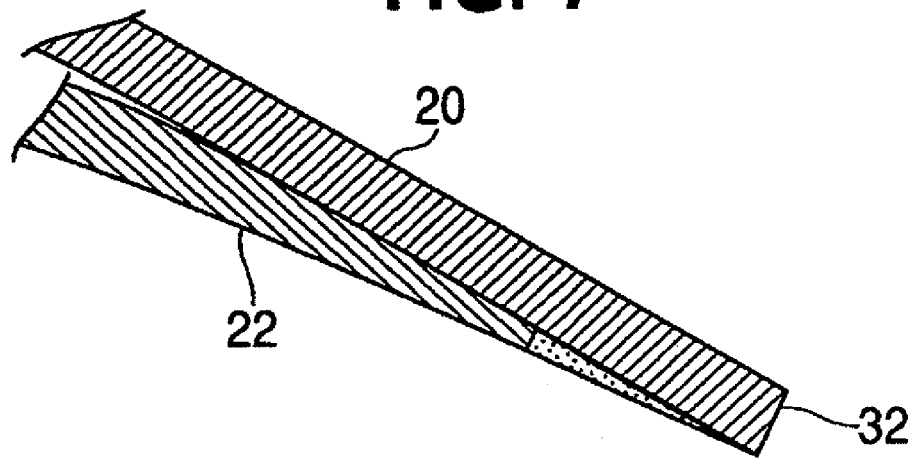
FIG. 7 is a cross-sectional view of the blade of FIG. 6 taken through line 7-7 of FIG. 6.

FIG. 6 is plan view of a completed blade. FIG. 7 is a cross-sectional view similar to FIG. 5 an illustrating embodiment of the trailing edge 32.

Figure 8:
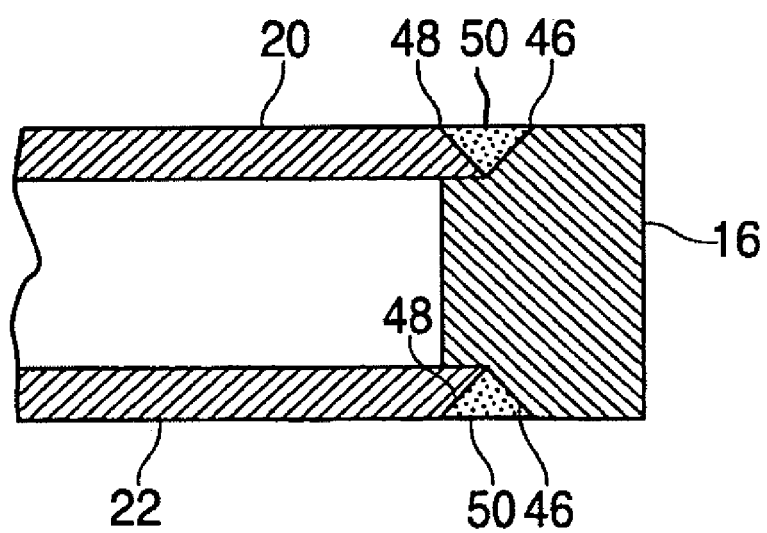
FIG. 8 is a partial cross-sectional view of the blade of FIG. 6 taken through line 8-8 of FIG. 6.
Figure 9:
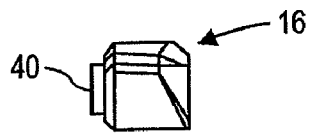
FIG. 9 is a side view of a cast impeller tip according to a preferred embodiment of the present invention.
Figure 10:
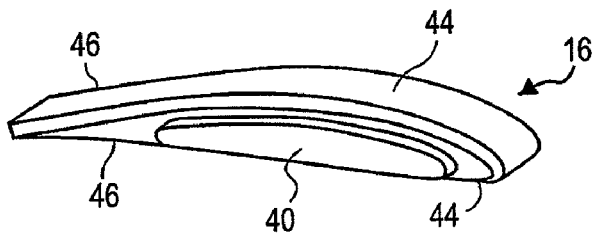
FIG. 10 is a perspective view illustrating the cast impeller tip of FIG. 9.
Figure 11:
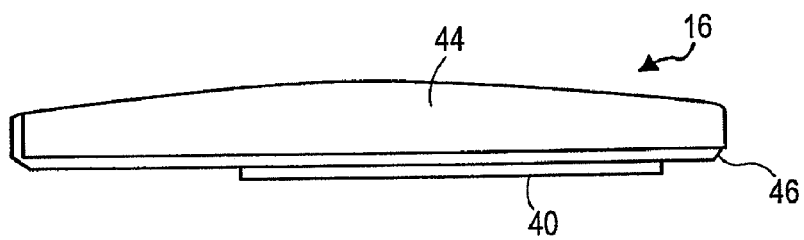
FIG. 11 is a plan view illustrating the cast impeller tip of FIG. 9.
Figure 12:
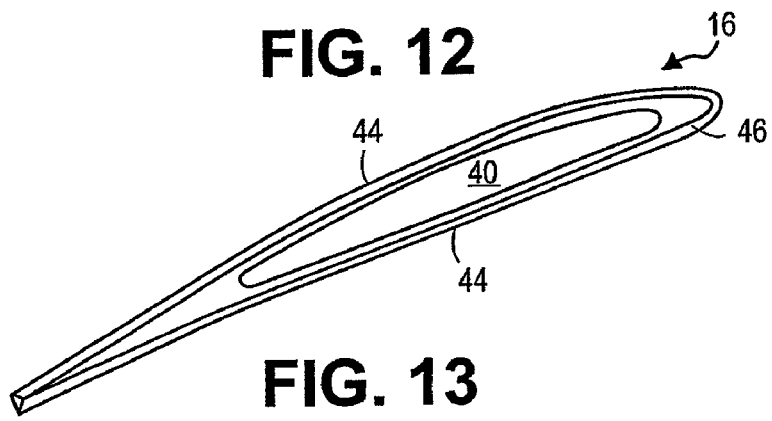
FIG. 12 is an end view illustrating the cast impeller tip of FIG. 9.
Figure 13:
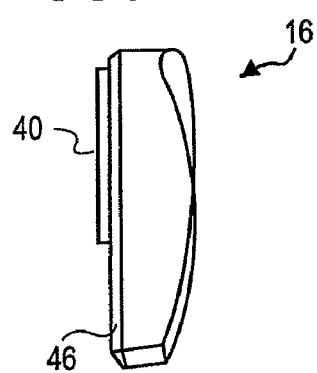
FIG. 13 is a perspective top view illustrating the cast impeller tip of FIG. 9.

FIG. 8 is a cross-sectional view taken through line 8-8 in FIG. 6. FIGS. 6 and 8 illustrate the feature of the cast tip 16 and its attachment to the top and bottom skins 20 and 22. In particular, as further shown in FIGS. 9-13, the cast tip 16 includes a shaped tab 40 that fits into the slot opening created by the inner surface profile of the top skin 20 and bottom skin 22 once that have been welded together as shown in FIG. 3. Returning to FIGS. 6-13, the cast tip 16 can have a three dimensionally curved contoured surface that on its face side 44 will have an outline corresponding to the outer surfaces of the top skin and bottom skin respectively, but at the outer tip of the tip 16 may be rounded and otherwise shaped as desired.

The cast tip 16 is preferably provided with bevel 46 and the top skin and bottom skin at the their outer edges are preferably also provide with a bevel 48 to facilitate mounting by top and bottom welds 50 as seen in FIG. 8.

The casting methods permits the outer contour of the tip 16 to be predesigned and no manual finishing is required for incursion and mounting of the tip, other than a smoothing of the welded areas 50. The tip may be casted from a suitable material in using any suitable casting or molding method.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A blade for use in an impeller assembly, comprising:
   a top skin element;
   a bottom skin element; and
   a unitary pre-shaped tip element attached to the top and bottom skin elements without an internal framework and disposed at the radial outside end of the blade,
   wherein the tip is welded to the top skin and to the bottom skin, wherein the tip has a bevel at the weld location, and wherein the top skin has a first edge that abuts the tip and wherein the lower skin has a second edge that abuts the tip, and wherein respective bevels are provided on the first and second edges adjacent the bevel of the tip to facilitate welding.

2. The blade according to claim 1, wherein the tip has a tab projecting radially inwardly into the blade into an opening formed between the top skin element and lower skin element.

3. The blade according to claim 1, wherein the tip element is cast from a casting material.

4. The blade according to claim 1, wherein the tip has a rounded end shape.

5. The blade according to claim 1, wherein the blade has an air foil shaped profile.

6. The blade according to claim 1, wherein the top and bottom skin elements form an at least partially hollow enclosure.

7. A blade for use in an impeller assembly, comprising:
   a top skin element;
   a bottom skin element; and
   a unitary pre-shaped tip element; and
   means for joining the tip to the top and bottom skin without an internal framework to form the radial outside end of the blade,
   wherein the tip is welded to the top skin and to the bottom skin, wherein the tip has a bevel at the weld location, and wherein the top skin has a first edge that abuts the tip, and wherein the lower skin has a second edge that abuts the tip, and wherein respective bevels are provided on the first and second edges adjacent the bevel of the tip to facilitate welding.

8. The blade according to claim 7, wherein the tip has a tab projecting radially inwardly into the blade into an opening formed between the top skin element and lower skin element.

9. The blade according to claim 7, wherein the tip element is cast from a casting material.

10. The blade according to claim 7, wherein the tip has a rounded end shape.

11. An impeller assembly, comprising:
    a hub; and
    a plurality of blades attached to the hub, each blade comprising:
      a top skin element;
      a bottom skin element; and
      a unitary pre-shaped tip element attached to the top and bottom skin elements without an internal framework and disposed at the radial outside end of the blade,
      wherein the tip is welded to the top skin and to the bottom skin, wherein the tip has a bevel at the weld location, and wherein the top skin has a first edge that abuts the tip, and wherein the lower skin has a second edge that abuts the tip, and wherein respective bevels are provided on the first and second edges adjacent the bevel of the tip to facilitate welding.

* * * * *